United States Patent [19]
Boie et al.

[11] Patent Number: 5,818,741
[45] Date of Patent: Oct. 6, 1998

[54] DIGITAL FILTERING SYSTEM FOR SIGNALS

[75] Inventors: Werner Boie, Strasbourg; Michel Sonrier, Obernal, both of France

[73] Assignee: Thomson multimedia S.A., Courbevoie, France

[21] Appl. No.: 632,932

[22] Filed: Apr. 16, 1996

[30] Foreign Application Priority Data

Apr. 28, 1995 [FR] France .................................. 95 05115

[51] Int. Cl.⁶ .................................................. G06F 17/10
[52] U.S. Cl. ...................................................... 364/724.17
[58] Field of Search ...................... 364/724.17, 724.14, 364/734

[56] References Cited

U.S. PATENT DOCUMENTS

| | | | |
|---|---|---|---|
| 5,440,503 | 8/1995 | Maruyama | 364/224.17 |
| 5,440,593 | 8/1995 | Leone | 3634/724.17 |
| 5,629,881 | 5/1997 | Leeb et al. | 364/724.17 |

FOREIGN PATENT DOCUMENTS 0648037  4/1995  European Pat. Off. .

OTHER PUBLICATIONS

IEEE Transactions on Vehicular Technology, vol. 42, No. 1, Feb. 1993 New York, NY, USA pp. 46–57 Chennakeshu & Saulnier "Differential Detection of pi/4–shifted—DQPSK for digital cellular radio".

*Primary Examiner*—David H. Malzahn
*Attorney, Agent, or Firm*—Joseph S. Tripoli; Frederick A. Wein

[57] ABSTRACT

The disclosure relates to a A digital filtering system of a signal, including a calculation circuit that calculates the average increase in amplitude $\Delta X_{av}(n)$ between two samples $X(n)$, and an "output signal ($Y(n)$) circuit" that calculates a mean, weighted by a coefficient a, of the sample to be filtered $X(n)$ and the previous sample $Y(n-1)$ algebraically increased by said average increase in amplitude $\Delta X_{av}(n)$. The invention is applicable to digital signal processing.

7 Claims, 5 Drawing Sheets

DIGITAL FILTERING SYSTEM FOR SIGNALS

BACKGROUND OF THE INVENTION

The present invention concerns a digital filtering system for signals, notably a digital system suitable for digital filtering of a monotonously increasing or decreasing signal. The signal is physically represented by a series of samples of finite value coded on N bits. In a preferred embodiment the digital representation of the signal to be filtered has modulo $2^N$ discontinuities.

The invention provides a solution for the filtering of the instantaneous phase of a signal, when this can be represented by a signal varying modulo $2\pi$ between two values $-\pi$ and $+\pi$ coded using an N bit code word as shown in FIG. 1.

This filtering operation may be necessary in systems where the phase information of a transmitted signal must be restored on reception, and must be free of perturbations generated during transmission or associated with the type of modulation. One particular example of this is terrestrial transmission of video signals.

DESCRIPTION OF THE PRIOR ART

The goal is a synchronous demodulation of a signal that consists in reconstructing from the carrier wave at the intermediate frequency of the received signal a reference signal in phase with this carrier and having the same frequency.

In addition to possible perturbations during transmission, the "residual sideband" nature of the video modulation intrinsically causes a phase modulation of the carrier at the higher frequencies of the modulating signal.

The restitution of this carrier (in digital or analog form) is generally performed using a "phase-lock loop" (PLL) (see FIG. 2). The filtering of the phase is then identified in the phase loop.

Another digital solution (FIG. 3) is to use algorithms such as the "CORDIC" algorithm described in the document "The Cordic Trigonometric Computing Technique", by J. E. Voider, IRE Transactions on Electronic Computers, pp. 330–334, September 1959, that are capable of providing data of the type shown in FIG. 1 on the instantaneous phase of the received signal.

After filtering, this information can be used directly to access a pre-memorized look-up table to generate the digital values of the reference signal thus constituted.

SUMMARY OF THE INVENTION

The present invention provides a solution for this type of filtering problem.

The invention relates to a digital filtering system for signals comprising:
- a calculation circuit that calculates the average increase in amplitude between two samples;
- an output signal circuit that calculates a mean, weighted by a coefficient, of the sample to be filtered and the previous sample algebraically increased by said average increase in amplitude.

When the signal has periodic discontinuities, the system according to the invention includes a circuit that compares two successive samples and a discontinuity correction circuit that operates when this comparison circuit detects a discontinuity between two samples.

More precisely, in the invention:
said calculation circuit that calculates the average increase in amplitude between two samples includes:
- a subtraction circuit to calculate the difference between two successive samples;
- a first adder circuit to add the average increase calculated previously to the variation of the weighted increase.

said output signal circuit includes:
- a second adder circuit that adds the sample calculated previously to the average increase in amplitude supplied by said calculation circuit;
- a third adder circuit that adds the value of a sample weighted by a coefficient $\alpha$ to the estimated value of a sample weighted by a coefficient $(1-\alpha)$.

BRIEF DESCRIPTION OF THE DRAWINGS

The invention will be better understood and other advantages and characteristics will become clear on reading the following description making reference to the appended figures, of which.

Figure 1:
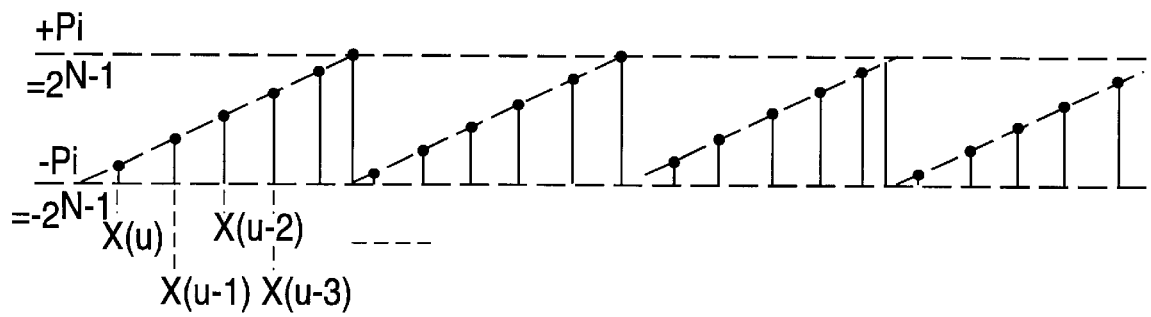
FIGS. 1 to 3 illustrate known techniques.
Figure 2:
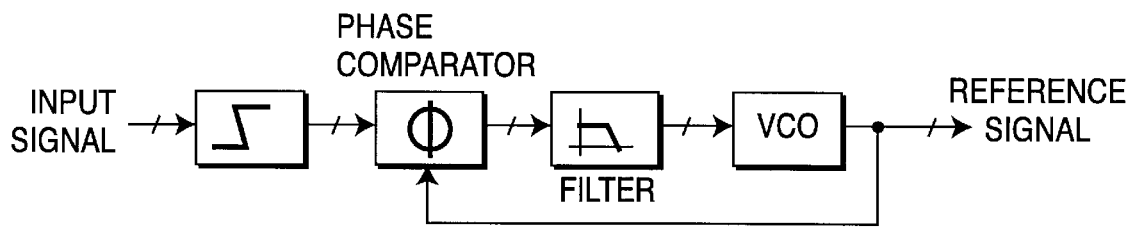
Figure 3:
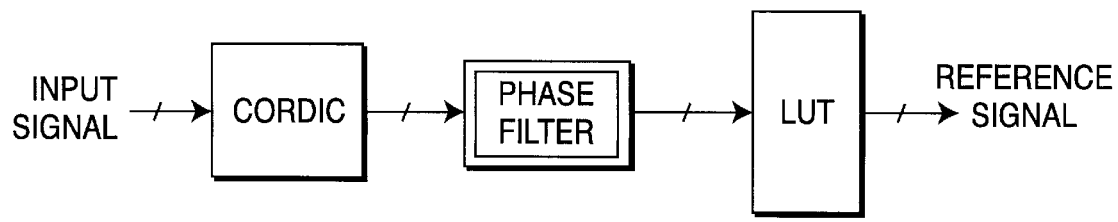
Figure 4:
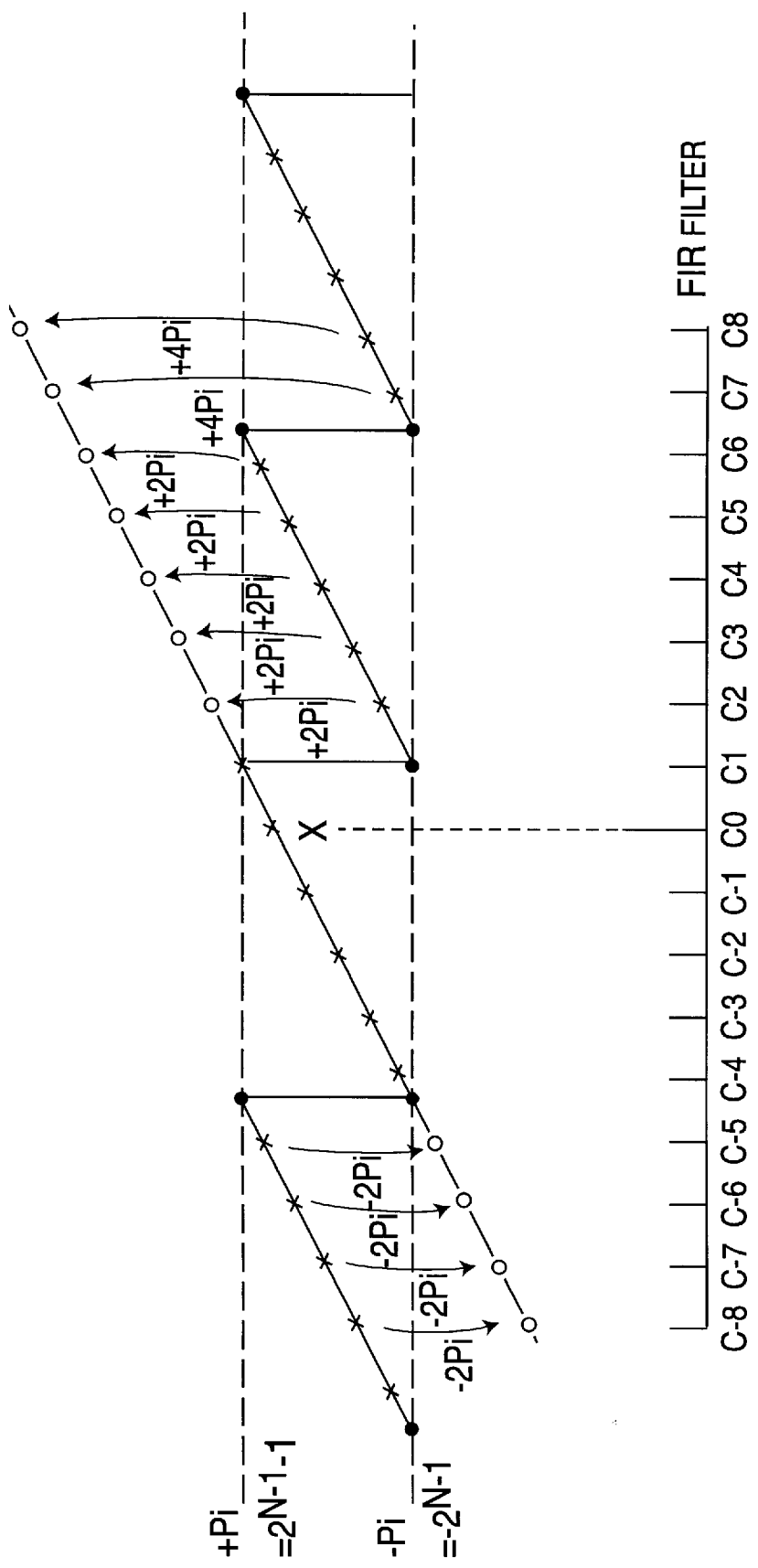
FIG. 4 is a diagram explaining the system according to the invention.

The basic principle of the invention is to manage dynamically the discontinuities of the signal to be filtered in order to make the signal monotonously increasing, as shown in FIG. 4, for the coefficients of a filter that could be of finite impulse response (FIR) type.

The method of processing of a sample X is to subtract $k2\pi$ from the samples from preceding samples and add $k2\pi$ to following samples for k discontinuities encountered after X.

This is associated with an increase in the number of bits required to represent the signal, which is a function of the number of samples per period of the signal and the dimension of the filter. Moreover, the number of tests can become prohibitive if the filter is overdimensioned. This is the case when a very low and selective cut-off frequency is required.

Figure 5:
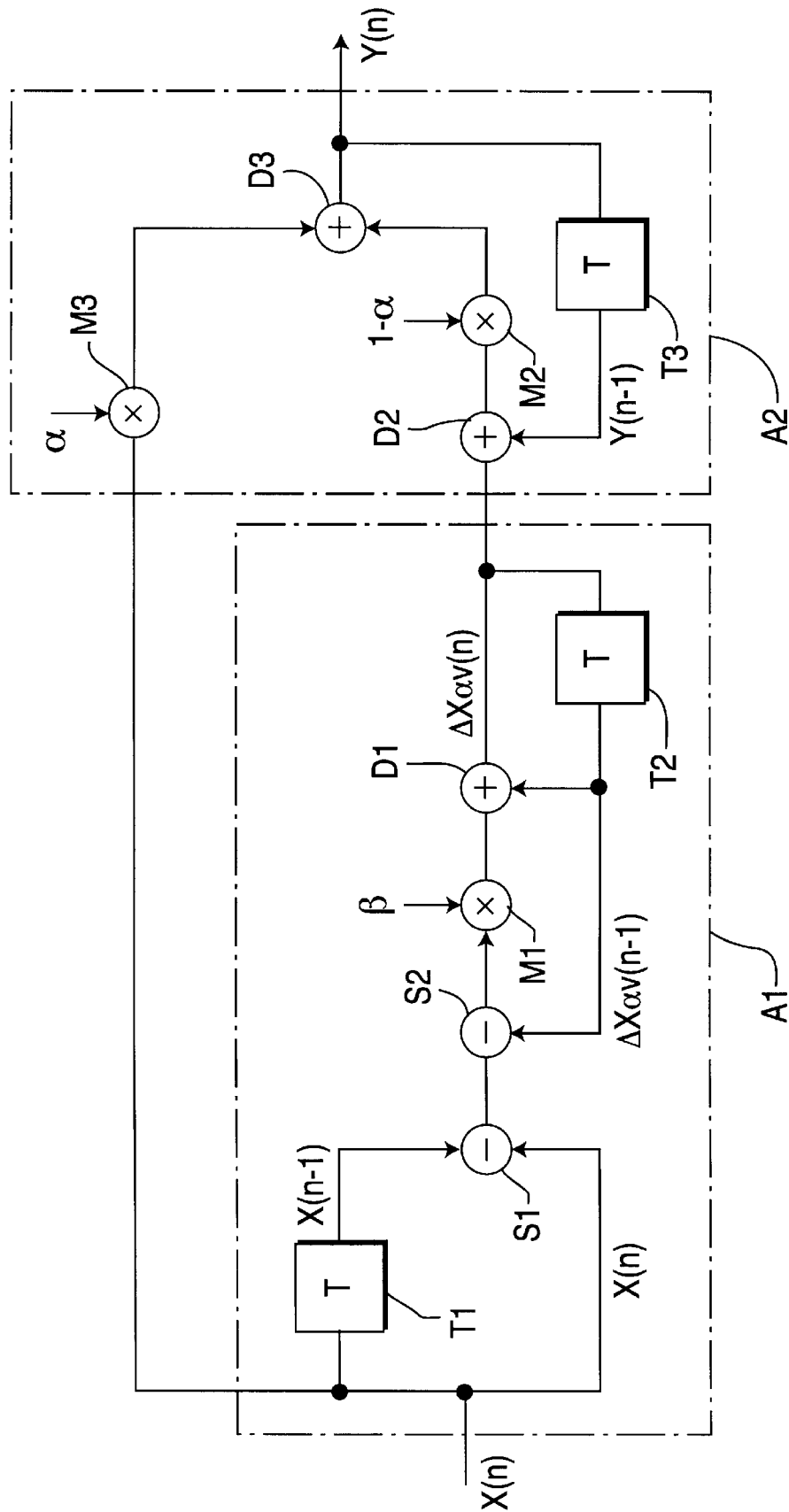
FIG. 5 is a simplified embodiment of the system according to the invention.

The invention therefore consists in using a infinite impulse response (IIR) filter of the type shown in FIG. 5. The filter includes two circuits A1 and A2.

A first circuit A1 calculates the average increase in amplitude $\Delta X_{av}(n)$ between the samples $X(n)$. The average value is taken from a IRR low-pass filter of the type:

$$\Delta X_{av}(n) = \Delta X_{av}(n-1) + \beta^*[\Delta X(n) - \Delta X_{av}(n-1)] \quad (1)$$

where $\Delta X(n) = X(n) - X(n-1)$

A second circuit A2 calculates the sample $Y(n)$ output from the filter as a average, weighted by a coefficient a, of the sample $X(n)$ to be filtered and an estimation $Y_{est}(n)$ of $X(n)$. $Y_{est}(n)$ is calculated from the preceding sample $Y(n-1)$ to which is added the average value of the difference between the samples $\Delta X_{av}(n)$ previously calculated:

$$Y(n) = \alpha^* X(n) + (1-\alpha a)^* Y_{est}(n) = Y_{est}(n) + \alpha^*[X(n) - Y_{est}(n)] \quad (2)$$

where $Y_{est}(n) = Y(n-1) + \Delta X_{av}(n)$

α and β define the cut-off frequency of the filter; when α and β are low, this frequency is also low.

The advantage of the invention is that it limits the horizon of the filter to two samples and the number of discontinuities to be handled to one.

The circuit A1 of FIG. 5 includes a delay circuit T1 that introduces a delay T corresponding to the time separating two samples to be processed, and a subtraction circuit S1 that subtracts two consecutive samples to obtain the value:

$$\Delta X(n)=X(n)-X(n-1)$$

A second delay circuit T2 introducing a delay T feeds a second subtraction circuit S2 with a difference of sample values $\Delta X_{av}(n-1)$ calculated previously that is subtracted from the preceding $\Delta X(n)$ value. This difference is assigned to the coefficient β by the multiplier M1. To this result is added (by the adder D1) the preceding value $\Delta X_{av}(n-1)$. The circuit A1 thereby enables the operation represented in equation (1) to be implemented.

The circuit A2 of FIG. 5 contains a delay circuit T3 introducing a delay T and an adder D2 used to add a sample Y(n−1) calculated previously to the sample difference $\Delta X_{av}(n)$ supplied by the circuit A1. This difference is weighted by the coefficient 1−α in the multiplier M2. The weighted result is added to the value of the sample weighted by the multiplier M3 (using the weighting coefficient α). This circuit A2 thereby enables the operation represented in equation (2) to be implemented.

Figure 6:
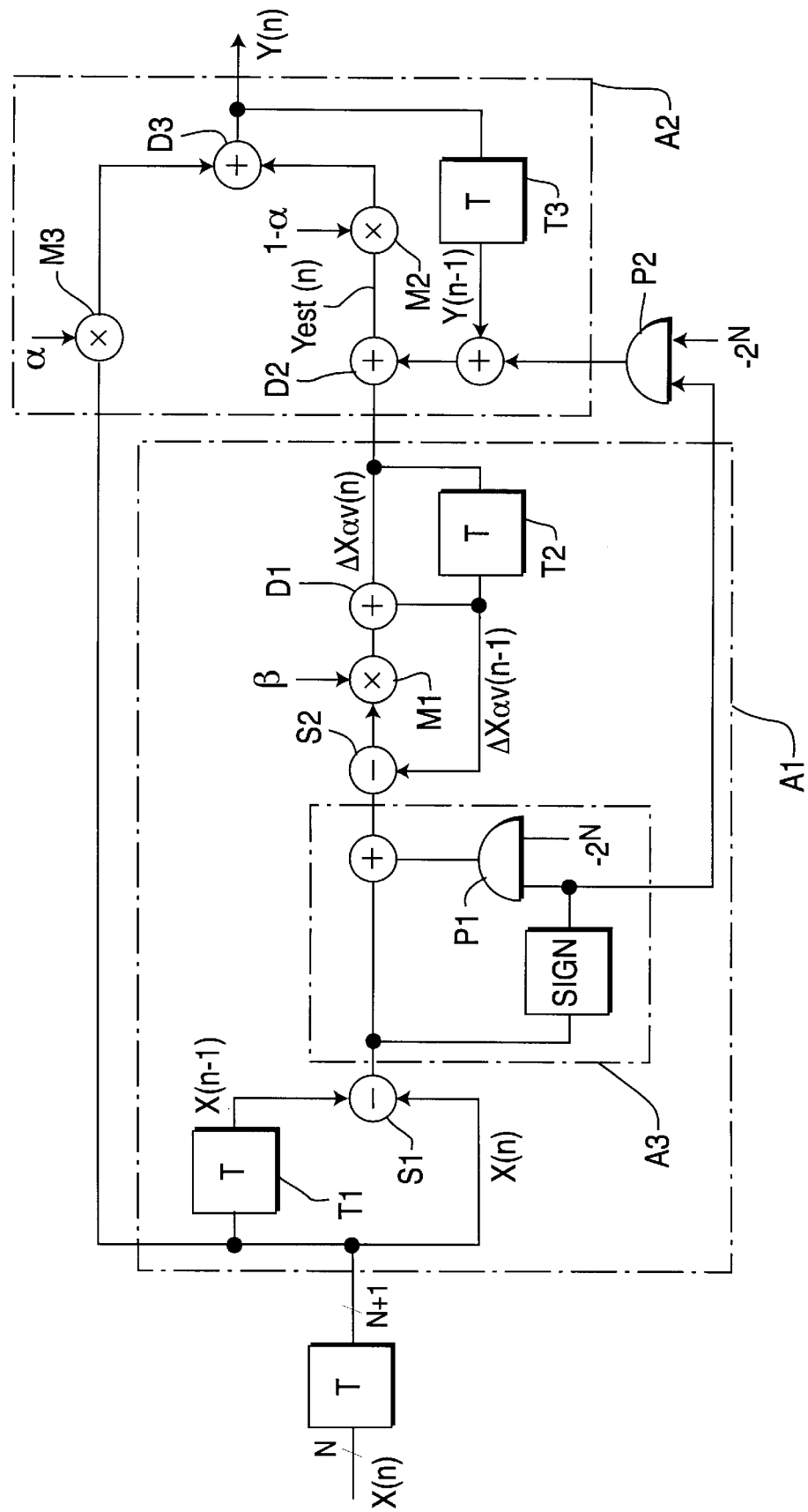
FIG. 6 is a more complete embodiment of the system according to the invention.

FIG. 6 shows an adaptation of FIG. 5 in order to handle discontinuities between two samples.

$$\text{If } X(n)<X(n-1), \text{ then } X(n-1)=X(n-1)-2^N \text{ and } Y(n-1)=Y(n-1)-2^N \quad (3)$$

In these equations $2^N$ represents the maximum value that a sample can take.

This operation is handled by the circuit A3 of FIG. 6.

Figure 7A:
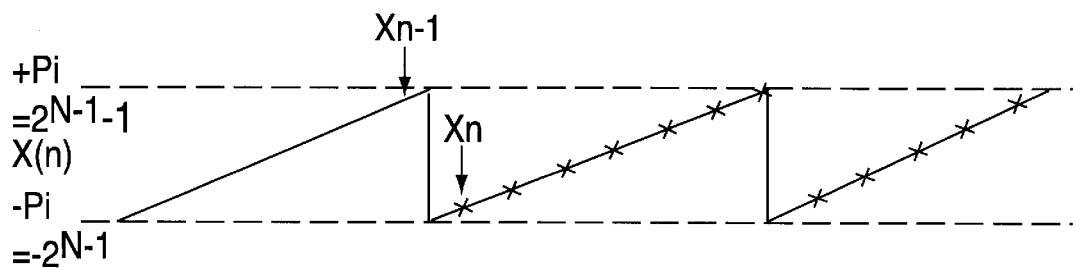
FIGS. 7a and 7b illustrate the handling of a particular filtering situation in the system according to the invention.

If the samples handled are X(n−1) and X(n) of FIG. 7a, we notice a sudden change between the two samples and a change in the sign of their difference.

The circuit SIGN of circuit A3 of FIG. 6 detects this sign. According to the value of this sign it controls the gates P1 and P2 to carry out the addition (or subtraction) of the maximum value ($2^N$) that a sample of the measured values X(n−1) and calculated values Y(n−1) can take.

The circuit A3 thereby enables the operation represented in equation (3) to be implemented.

Figure 7B:
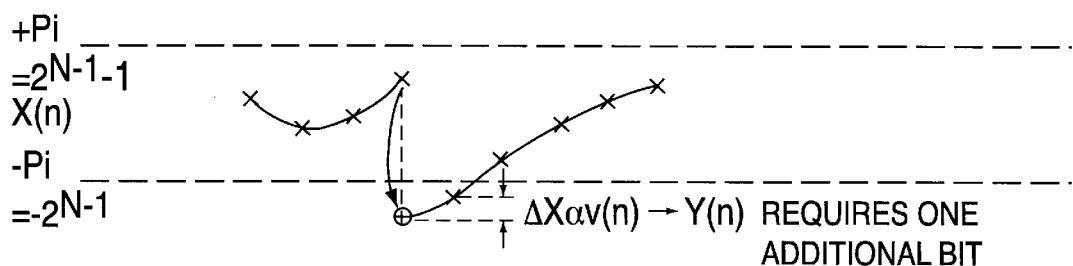

We notice here that this operation imposes an extra bit in the representation of the samples, since the result may exceed the limits of the initial representation of these samples (N bits), as shown in FIG. 7b.

In other words, if the input samples take values in the interval $[-2^{N-1}, +2^{N-1}]$, modulo $2^N$, then they must be represented using N+1 bits during filtering and on output from the filtering.

What is claimed is:

1. A digital filtering system of a signal, including:
   a calculation circuit for providing values $\Delta X_{av}(n)$ that are a function of the difference of successive samples (X(n), X(n−1)); and
   an output processing circuit which provides output samples Y(n) formed of a weighted combination of samples X(n) to be filtered and immediately provided output samples Y(n−1) algebraically increased by said values $\Delta X_{av}(n)$.

2. A digital filtering system of a signal according to claim 1, wherein said signal to be filtered has periodic discontinuities and said system further includes a circuit for detecting a discontinuity between the successive samples, and a circuit for correction of discontinuities upon detecting a discontinuity between the successive samples.

3. A digital filtering system of a signal according to claim 2, wherein said correction circuit adds to or subtracts from the difference of successive samples and the values $\Delta X_{av}(n)$ the maximum value ($2^N$) that a sample can take.

4. A digital filtering system of a signal according to claim 1, wherein said calculation circuit includes:
   a subtraction circuit to calculate the difference $\Delta X(n)$ between two successive samples;
   a first adder circuit to add the values $\Delta X_{av}(n)$ calculated previously to the variation of the weighted increase β.

5. A digital filtering system of a signal according to claim 4, wherein said output processing circuit includes:
   a second adder circuit that adds the immediately provided output samples Y(n−1) to the values $\Delta X_{av}(n)$ supplied by the calculation circuit;
   a third adder circuit that adds the values of a sample X(n) weighted by a coefficient α to the immediately provided output samples Y(n−1) algebraically increased by said values $\Delta x_{av}(n)$ weighted by a coefficient (1−α).

6. A digital filtering system of a signal according to claim 5, wherein said circuit for detecting and correcting includes:
   a circuit to calculate the sign of the difference between samples;
   circuits to control the addition (or subtraction) of a maximum sample value $2^N$ to the values of the difference of successive samples and the values $\Delta X_{av}(n)$, said circuits operating under control of said circuit that calculates the sign of the difference between samples, according to the value of this sign.

7. A digital filtering system of a signal according to claim 1, wherein said function is:

$$\Delta X_{av}(n)=\Delta X_{av}(n-1)+\beta$$

wherein $\Delta X(n)=X(n)-X(n-1)$.

* * * * *